(No Model.)

J. JACOBSON.
FRAMED PICTURE, MIRROR, AND THE LIKE, AND METHOD OF FORMING THE SAME.

No. 479,004. Patented July 19, 1892.

Witnesses
Jas. J. Maloney.
M. E. Hill

Inventor,
John Jacobson,
by Jno. P. Swinmore
Atty.

THE NORRIS PETERS CO., PHOTO-LITHO., WASHINGTON, D. C.

UNITED STATES PATENT OFFICE.

JOHN JACOBSON, OF BOSTON, MASSACHUSETTS.

FRAMED PICTURE, MIRROR, AND THE LIKE, AND METHOD OF FORMING THE SAME.

SPECIFICATION forming part of Letters Patent No. 479,004, dated July 19, 1892.

Application filed June 25, 1891. Serial No. 397,521. (No model.)

*To all whom it may concern:*

Be it known that I, JOHN JACOBSON, of Boston, county of Suffolk, State of Massachusetts, have invented an Improvement in Framed Pictures, Mirrors, and the Like, and Method of Forming the Same, of which the following description, in connection with the accompanying drawings, is a specification, like letters on the drawings representing like parts.

The invention consists of a framed picture, mirror, or the like, having the frame formed of plastic material molded about and inclosing the edges of the object front and back; and the invention also consists in the method of forming such framed pictures, mirrors, and the like by molding plastic material about the picture, mirror, or other object, and thereby not only forming the frame, but also at the same time and by the same steps framing the said picture, mirror, or other object, all as I will proceed now more particularly to set forth and finally claim.

The frame is composed of a plastic material molded to shape upon the picture and the glass which supports and protects the face of the picture and embracing within it the margin of the glass, thus making the entire frame an integral piece of material having the picture and its glass securely embedded therein.

Figure 1:
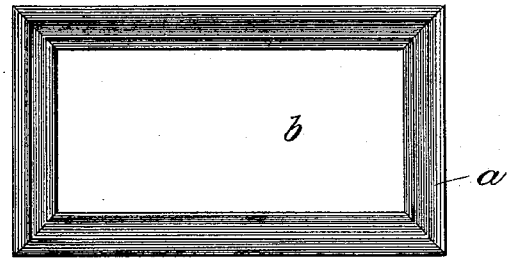
Figure 2:
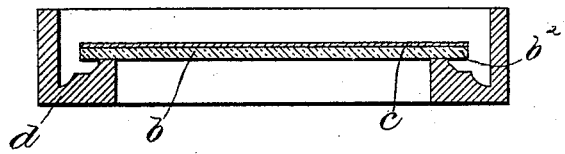
Figure 3:
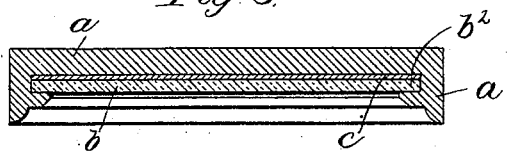

Figure 1 is a front elevation of a picture-frame embodying this invention; Fig. 2, a longitudinal section of the mold, glass, and picture, illustrating the method of producing the frame; Fig. 3, a longitudinal section of the framed picture; and Figs. 4 and 5, similar views of the mold and frame, showing a somewhat modified construction.

Figure 5:
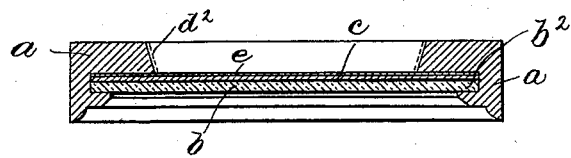

The frame $a$, Fig. 1, is a single piece of cement or material that was shaped while in plastic condition and subsequently set or hardened to retain its shape, the said frame inclosing securely within it the glass $b$ and picture $c$, as shown in Fig. 5.

In order to produce a frame in accordance with this invention, a mold $d$ (see Figs. 2 and 4) is made having the shape or ornamentation desired for the face of the finished frame, and in said mold is placed the glass $b$, with the picture $c$ in position on the back of it, as shown in Fig. 2, the margin of the glass overhanging the hollow of the mold, as shown at $b^2$, so that when the cement is run into the mold while in plastic condition it extends beneath the margin of the glass, and thus securely confines the same when removed from the mold after the cement has set.

In the arrangement shown in Figs. 2 and 3 the glass and picture constitutes the bottom of the main portion of the space into which the cement is run, and the cement overlies the entire back of the picture, pressing the same into even contact with the glass and affording a smooth or level finish for the entire back of the frame.

Figure 4:
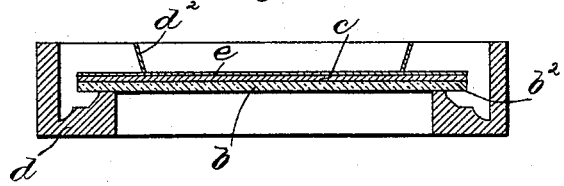

When it is desired to lighten the frame by using a smaller amount of cement, an inner mold $d^2$ may be applied over the back of the glass and picture, as shown in Fig. 4, which inner mold may be a strip of thin metal and may remain with the frame, as shown in dotted lines, Fig. 5, or may be removed after the cement has set, thus leaving the front and back of the frame open over the middle portion of the glass and picture, the margins of which are embedded in the material of which the frame is composed.

When the back of the frame is to be open like the front, as shown in Fig. 5, it is desirable to put a back piece over the picture, as shown at $e$, which back piece may be another plate of glass or, preferably, a plate of sheet metal, in order to prevent the passage of light to the rear face of the picture.

The construction shown in Figs. 4 and 5 may be used for framing transparencies, in which case there need be no back plate $e$, or a transparent back plate may be used, or one having the desired character of translucency. Any cement material having the desired degree of plasticity and necessary strength when set may be used, and its surface may be finished with any suitable coating after the frame has been removed from the mold, or, if desired, a bronze or metallic surface can be applied thereto by coating the inner surface of the mold with the surface material before the cement is run into the mold, in which case the cement will adhere to the coating and remove it from the mold, while said coating will retain the polish or other characteristics of surface that were imparted to it by contact with the surface of the mold.

It is obvious that the molds can be made in separate parts when required in order to enable the frame to be withdrawn in case the surface of the frame is to have undercut or overhanging parts.

I claim—

1. A framed article—such as a picture—having the frame formed of plastic material molded about and inclosing the edges of the article front and back, substantially as described.

2. The method of framing articles, which consists in supporting the article to be framed in a mold and leaving the edges of such article free at front and back, then introducing into said mold a frame-forming material in plastic condition and working it about the front and back edges of the article, thereby to inclose such article in such plastic material and to fashion the frame, then allowing the frame to set, and then separating it from the mold, substantially as described.

In testimony whereof I have signed my name to this specification in the presence of two subscribing witnesses.

JOHN JACOBSON.

Witnesses:
 JOS. P. LIVERMORE,
 M. E. HILL.